(12) United States Patent
Liu et al.

(10) Patent No.: US 11,155,948 B2
(45) Date of Patent: Oct. 26, 2021

(54) ELECTROSPUN FIBERS, MATS, AND METHODS OF MAKING FIBERS AND MAT

(71) Applicant: The United States of America, as represented by the Secretary of Agriculture, Washington, DC (US)

(72) Inventors: Lin S. Liu, Blue Bell, PA (US); Peggy M. Tomasula, Titusville, NJ (US); Shih-Chuan Liu, Taichung (TW)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 463 days.

(21) Appl. No.: 15/875,193

(22) Filed: Jan. 19, 2018

(65) Prior Publication Data
US 2018/0142388 A1 May 24, 2018

Related U.S. Application Data

(62) Division of application No. 14/554,736, filed on Nov. 26, 2014, now Pat. No. 9,909,241.

(51) Int. Cl.
| | | |
|---|---|---|
| *D04H 1/728* | (2012.01) | |
| *C08L 89/00* | (2006.01) | |
| *D01D 5/00* | (2006.01) | |
| *D01F 4/00* | (2006.01) | |
| *D01F 11/02* | (2006.01) | |

(52) U.S. Cl.
CPC ............ *D04H 1/728* (2013.01); *C08L 89/005* (2013.01); *D01D 5/003* (2013.01); *D01D 5/0038* (2013.01); *D01D 5/0046* (2013.01); *D01F 4/00* (2013.01); *D01F 11/02* (2013.01); *D10B 2211/20* (2013.01)

(58) Field of Classification Search
CPC .... D04H 1/728; D04H 3/015; D10B 2211/24; D10B 2211/00; D10B 2211/20; D01F 4/04; D01F 9/00; D01F 9/04; C08B 37/0018; C08L 89/005; D01D 5/0007–0092
See application file for complete search history.

(56) References Cited

U.S. PATENT DOCUMENTS

| | | | | | |
|---|---|---|---|---|---|
| 3,794,731 | A | * | 2/1974 | Dannert ................... | A23J 3/26 426/276 |
| 4,118,520 | A | * | 10/1978 | Visser ...................... | A23J 3/26 426/574 |

(Continued)

FOREIGN PATENT DOCUMENTS

JP       2010001595 A       1/2010

OTHER PUBLICATIONS

Hu, Jinlian. (2011). Adaptive and Functional Polymers, Textiles and their Applications—7.2.1.1 Definition of Electrospinning. World Scientific. Retrieved fromhttps://app.knovel.com/hotlink/pdf/id:kt00C24PLH/adaptive-functional-polymers/definition-electrospinning (Year: 2011).*

(Continued)

*Primary Examiner* — Marla D McConnell
*Assistant Examiner* — Larissa Rowe Emrich
(74) *Attorney, Agent, or Firm* — John Fado; Ariel Atkinson

(57) ABSTRACT

Disclosed herein are methods of forming a fiber mat, involving forming an aqueous solution of at least one protein, at least one polysaccharide, and optionally a plasticizer, and electrospinning the aqueous solution onto a collector to form a mat.

4 Claims, 4 Drawing Sheets

(56) References Cited

U.S. PATENT DOCUMENTS

| | | | |
|---|---|---|---|
| 2004/0046277 A1* | 3/2004 | Buerger | C08L 89/00 264/186 |
| 2004/0241436 A1* | 12/2004 | Hsieh | D01D 5/0007 428/361 |
| 2009/0311407 A1* | 12/2009 | Lucey | A23C 21/08 426/573 |
| 2010/0216211 A1 | 8/2010 | Shauer et al. | |
| 2013/0164731 A1 | 10/2013 | Baier et al. | |
| 2013/0264731 A1* | 10/2013 | Baier | D01D 5/0038 264/10 |
| 2013/0302896 A1 | 11/2013 | Shah et al. | |
| 2014/0322512 A1 | 10/2014 | Pham et al. | |
| 2016/0024690 A1* | 1/2016 | Francis | D01D 5/0084 264/465 |

OTHER PUBLICATIONS

Nieuwland, M. et al, "Food-Grade Electrospinning of Proteins," Innovative Food Science and Emerging Technologies, (2013), 20:269-275 (Year: 2013).*

Stijman, A. C. et al., "Electrospinning of Food-Grade Polysaccharides," Food Hydrocolloids, (2011), 25:1393-1398 (Year: 2011).*

Alborzi, S. et al., "Electrospinning of Sodium Alginate-Pectin Ultrafine Fibers," Journal of Food Science, (2010), 75(1):100-107.

Nieuwland, M. et al, "Food-Grade Electrospinning of Proteins," Innovative Food Science and Emerging Technologies, (2013), 20:269-275.

Stijman, A. C. et al., "Electrospinning of Food-Grade Polysaccharides," Food Hydrocolloids, (2011), 25:1393-1398.

Zhang, S. et al., Gelatin Nanofibrous Membrane Fabricated by Electrospinning of Aqueous Gelatin Solutions for Guided Tissue Regeneration, Journal of Biomedical Materials Research Part A, (2008), Abstract Published online in Wiley InterScience DOI: 10.1002/jbm.a.32136.

Machine translation of JP 2010001595 A (published on Jan. 7, 2010).

* cited by examiner

ELECTROSPUN FIBERS, MATS, AND METHODS OF MAKING FIBERS AND MAT

CROSS-REFERENCE TO RELATED APPLICATIONS

This application is a divisional application of U.S. application Ser. No. 14/554,736, filed Nov. 26, 2014, the contents of which are incorporated herein by reference in their entirety.

BACKGROUND OF THE INVENTION

Disclosed herein are methods of forming a fiber mat, involving forming an aqueous solution of at least one protein, at least one polysaccharide, and optionally a plasticizer, and electrospinning the aqueous solution onto a collector to form a mat.

Casein represents approximately 80% of the protein content in milk. It is composed of alpha $s_1$, alpha $s_2$, beta- and kappa-casein in the ratios of approximately 40:10:35:12 (Fox, P. F., The milk protein system, In: Developments in Dairy Chemistry—4, Functional Milk Proteins, P. F. Fox, ed., Elsevier Applied Science, New York, 1989) and exists in a colloidal complex bound together by Ca—P linkages and hydrophobic interactions. Kappa-casein stabilizes the exterior of the micelle, preventing precipitation of the other caseins through hydrophilic interactions. Because casein is a phosphoprotein, it binds Ca in proportion to the number of P groups and may also bind other minerals such as Zn. Because of its unique open structure, the casein micelle structure as it exists in milk has been proposed as a nano encapsulant for targeted nutritional or drug delivery (Livney, Y. D., et al., Nanoencapsulation of hydrophobic nutraceutical substances within casein micelles, XIVth International Workshop on Bioencapsulation, Lausanne, CH. 07-4 pg. 1-4 (2006)).

Casein has very low amounts of cysteine and no disulfide linkages, giving it a random coil structure (Gennadios, A., et al., Chapter 9, Edible Coatings and Films Based on Proteins In Edible Coatings and Films to Improve Food Quality, J. M. Krochta et al. eds., Technomic Publishing Co., Inc., Lancaster, Pa., 1994) with very little secondary or tertiary structure. The random coil structure is responsible for the ability of casein to form films. The large number of proline residues allows bending of the protein chains but prevents building of secondary structures. Casein is very sensitive to pH which dictates its structure in solution, and ultimately its function. At low pH, casein is typically in the form of aggregates because the negative charges on the casein are neutralized upon lowering of pH to the isoelectric point of 4.6, with decreased repulsion between the side chains (Chakraborty, A., and S. Basak, J. Photochem. Photobiol. B, 87: 191-199 (2007)). Furthermore, the Ca—P linkages are dissolved, releasing the individual casein and the micellar structure is lost (Gennadios et al. 1994). Treating milk with rennet produces rennet casein which retains the micellar structure. Gelled products such as yogurt and some cheeses are manufactured under low pH conditions. Acid casein may be dried and used in food products or in nonfood applications. With the addition of a base such as Na or Ca(OH)$_2$ to acid casein, at pH in the range from approximately 7 to 9, the casein is solubilized and electrostatic interactions are favored over other interactions such as hydrophobic interactions and hydrogen bonding. The caseinate formed does not have micellar structure. These properties in addition to the random coil structure have been exploited to form edible films and coatings from calcium caseinate (CaCAS), CO$_2$ casein, and sodium caseinate (NaCAS) (Tomasula, P. M., Using dairy ingredients to produce edible films and biodegradable packaging materials, In: Dairy-derived ingredients—Food and nutraceutical uses, M. Corredig, ed., Woodhead Publishing Ltd and CRC Press LLC, Boca Raton, Fla., 2009).

Casein-based edible films have usually been made using a casting process in order to determine their properties. They have excellent tensile and oxygen barrier properties, making them excellent candidates for use in a wide variety of applications (Krochta, J. M., E. A. Baldwin, M. Nisperos-Carriedo, eds, 1994, Edible Coatings and Films to Improve Food Quality, Technomic Publishing Co., Inc., Lancaster, Pa.; Tomasula, 2009). Because of their food-grade status, edible casein films have been proposed for use as part of food systems to prevent migration of components, add to appearance, and to add antimicrobials or nutrients (McHugh, T. H., and J. M. Krochta, Food Technol., January 1994, pp. 97-103). Casein and caseinates have long been used in wet spinning processes for the manufacture of casein fibers for woolen and silk-like fabrics, although they were treated with formaldehyde to harden the fibers (Sutermeister, E., and F. L. Browne, Casein and Its Industrial Applications, Reinhold Publishing Corporation, New York, 1939). Casein fibers have also been proposed for obtaining artificial food protein fibers by spinneret wet spinning (Suckov, V. V., et al., Die Nahrung., 24: 893-897 (1980)).

Recently, electrospinning, a technology for making nonwoven mats from continuous fibers with thicknesses on the nano or microscale, has been used for applications ranging from building tissue engineering scaffolds to use as filter media (Greiner, A., and J. H. Wendorff, Angew. Chem. Int. Ed., 46: 5670-5703 (2007)). The fibers have a high surface area, on the order of 1000× greater than their volume, yielding electrospun products with increased surface efficiency compared to cast films. Electrospinning involves applying a high voltage to a solution containing the polymer. As a solution that is spinnable is discharged dropwise through a nozzle, the electric field causes the drop to form in a cone shape which then forms a continuous jet. The jet becomes narrower and forms an open coil as it approaches a counter electrode. The solvent simultaneously evaporates, precipitating the polymer on the counter electrode. The drop is balanced at the nozzle by its surface tension and is ejected when the electric field is opposed by the solution electrostatic forces that become larger than the surface tension (Greiner and Wendorff, 2007). For successful creation of fibers, electrospinning requires solubility in the solvent, the electric field needs to exceed that of the surface tension at the nozzle to form the cone, and entanglement of the molecular chains of the polymer, which is a function of the viscosity of the solution (Stijnman, A. C., et al., Food Hydrocolloids, 25: 1393-1398 (2011)). Uneven jet formation or electrospraying results in fibers that are interspersed with beads and other shapes. While electrospinning has been successfully applied to synthetic polymers, it has more recently been applied to natural polymers.

There are several examples of electrospinning of natural (non food) and synthetic polymers in non aqueous solvents, but there are relatively few examples of natural polymers electrospun from aqueous solutions, which would include polysaccharides and proteins for food applications. Stinjman et al. (2011) found that the minimum requirements for electrospinning of polysaccharides, such as the conditions under which a jet and then fibers were formed, were shear-thinning behavior at shear rates less than 1000 s$^{-1}$ and overlap concentration, a measure of the chain to chain interactions and entanglement. Under these conditions, fibers were formed from dextran and pullulan (PUL). Electrospun proteins have required use of a process aid or carrier such as poly (ethylene oxide) (PEO), which has been used to electrospin several proteins, polysaccharides, and cellulose derivatives that cannot be electrospun alone (Alborzi, S., et al., J. Food Sci., 75: C100-107 (2010)). PEO is believed to lower the surface tension and electrical conductivity of the solution, thus enabling electrospinning of the mixture. However, proteins electrospun with PEO are not edible.

Electrospinning of proteins without a carrier has been demonstrated for zein and gelatin. Zein was electrospun from 70% EtOH solutions (Miyoshi, T., et al., Polymer International., 54: 1187-1190 (2005); Kanjanapongkul, K., et al., J. Appl. Poly. Sci., 118: 1821-1829 (2010)) and gelatin was electrospun from water only (Zhang, S., et al., J. Biomedical Materials Research, Part A, 90: 671-679 (2009). Gelatin at a 12.5 wt % concentration (150A, 75B gelatin) was also used as a carrier for electrospinning of proteins such as whey protein isolate, ovalbumin, BSA, soy protein isolate, and NaCAS, with optimal spinning temperature of 40° C. (Nieuwland, M., et al., Innovative Food Sci. and Emerging Tech., 20: 269-275 (2013)). The ability to electrospin a particular protein was also found to be related to an ultrasonic treatment that was required to disrupt aggregated proteins. A harsh treatment of the NaCAS-gelatin solution was required prior to electrospinning.

We have determined the molecular parameters and the operating conditions necessary to electrospin aqueous solutions of proteins (e.g., CaCAS, NaCAS) and polysaccharides (e.g., pullulan) for potential food applications The proteins may also be blended together and fats with milk fats added to form emulsified structures.

SUMMARY OF THE INVENTION

Disclosed herein are methods of forming a fiber mat, involving forming an aqueous solution of at least one protein, at least one polysaccharide, and optionally a plasticizer, and electrospinning the aqueous solution onto a collector to form a mat.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION OF THE INVENTION

Figure 1:
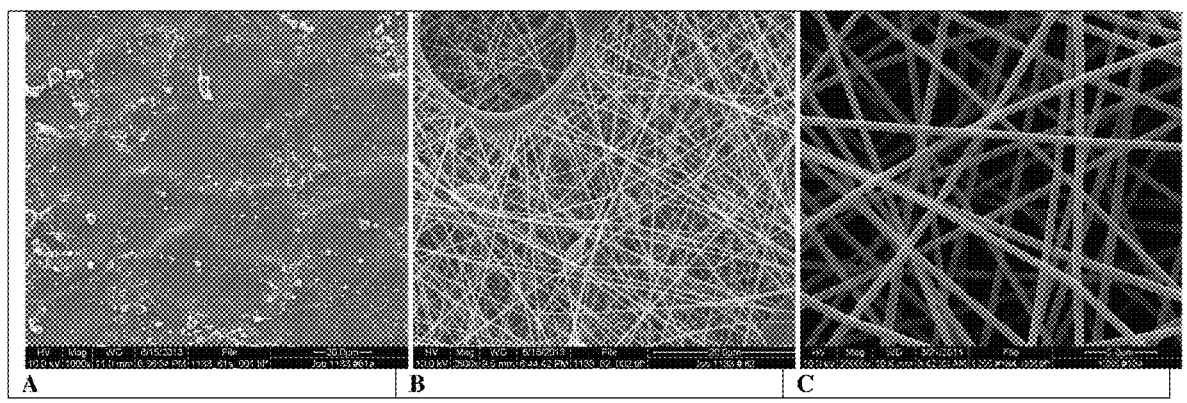
FIG. 1 shows SEM of electrospun fibers obtained from 5, 10 and 15% PUL solutions as described below: (A) 5% PUL solution (1000×), (B) 10% PUL solution (2500×), (C) 15% PUL solution (25,000×). Electrospinning was conducted at 40° C. and at 3 mL/hr. Voltage was 10.5 kV for (A) and (C) and 8 kV for (B).

Disclosed herein are methods of forming a fiber mat, involving forming an aqueous solution of at least one protein, at least one polysaccharide, and optionally a plasticizer and electrospinning said aqueous solution onto a collector (e.g., rotating cylinder or durm) to form a mat. At this stage we do not collect a single fiber on, for example, a spool; we produce the fibers onto a defined area which may be fixed or moving, such as on a rotating cylinder or drum. The fibers are laid over the surface creating the mat.

The method generally utilizes a needle and a voltage source connected to the needle, wherein the distance between the tip of the needle and the collector is about 12 cm to about 15 cm (e.g., 12-15 cm). The voltage source generally provides about 23 kV. The method can also involve soaking the mat in a solution containing ethanol and glutaraldehyde to remove polysaccharides.

The pure aqueous solutions may contain up to about 20% by weight of the protein, or up to about 50% of the polysaccharide. In solutions containing mixtures of the two, the solution may contain about 20% protein and about 20% of the polysaccharide. The solutions of either the polysaccharides or proteins were used as our source solutions which we then blended together to get our solution containing both the protein and polysaccharide.

Proteins which may be used in the method include, for example, food grade proteins such as caseinates (e.g., calcium caseinate, $CO_2$ casein, sodium caseinate), acid casein, rennet casein, the individual casein proteins such as alpha, beta and kappa-caseins; skim and milk that contains fats such as whole milk or low fat milk and milk protein concentrates; pre fermented or post-fermented milk containing dairy cultures, probiotics, prebiotics, or fibers; milk containing whey protein concentrates, whey protein isolates, the individual whey proteins such as beta-lactoglobulin, alpha-lactalbumin, BSA, soy protein isolate, corn protein isolate, and the like; casein and whey peptides solutions, alone or in combination; cheese milk; amino acids, or in various mixtures of the above.

Polysaccharides which may be used in the method include, for example, food grade polysaccharides such as pullulan, dextran, pectin, chitosan, lactose, lactulose, and other biopolymers. The proteins may also be blended together and fats (e.g., milk fats) added to form emulsified structures.

Plasticizer which may be used in the method include, for example, glycerol, water, sorbitol, polyethylene glycol, propylene glycol, sugars such as glucose and sucrose, monosaccharides, oligosaccharides, lipids such as monoglyceride, acetylated monoglycerides, and fatty acids such as lauric acid, linoleic acid, stearic acid, and others known in the art.

The method does not utilize a process aid or carrier such as poly (ethylene oxide) (PEO).

"Optional" or "optionally" means that the subsequently described event or circumstance may or may not occur, and that the description includes instances in which said event or circumstance occurs and instances where it does not. For example, the phrase "optionally comprising a defoaming agent" means that the composition may or may not contain a defoaming agent and that this description includes compositions that contain and do not contain a foaming agent.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

Unless defined otherwise, all technical and scientific terms used herein have the same meaning as commonly understood by one of ordinary skill in the art to which the invention belongs. As used herein, the term "about" refers to a quantity, level, value or amount that varies by as much as 30%, preferably by as much as 20%, and more preferably by as much as 10% to a reference quantity, level, value or amount. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Materials and Methods: Sodium caseinate (NaCAS) and calcium caseinate (CaCAS) were obtained from the American Casein Co. (Burlington, N.J.). According to the manufacturer, NaCAS contained 93% protein (dry basis) or 89% protein (as is), fat 1.5%, ash 3.5%, carbohydrate <1%, and moisture 5%; pH was 6.9. CaCAS contained 91% protein on a dry basis and 88% as is, fat 1.7%, ash 4.0%, carbohydrate <1%, and moisture 5%; pH was 6.9. Pullulan (PUL) was obtained from TCI America (Portland, Oreg.). All materials were used without further modification or purification. The deionized water used in all solutions was produced using a Barnstead E-pure water system (Dubuque, Iowa).

Stock solutions of aqueous CaCAS or NaCAS were prepared containing either 15 or 20% (w/w). These were diluted with solutions of PUL prepared at concentrations ranging from 3 to 15% (w/w). Solutions of CaCAS/PUL or NaCAS/PUL were prepared with deionized water to total solids concentrations ranging from 1.7 to 20% (w/w). The concentration of CaCAS or NaCAS was 20% and that of PUL was 15% in CAS/PUL solutions. After the addition of the caseinates, polysaccharides, and optionally glycerol to water, the solutions were mechanically stirred (Cole-Parmer, Vernon Hills, Ill.) for 1 to 2 hrs at 1000 rpm. The solutions were refrigerated overnight at 4° C. to remove air bubbles.

Fibrous Mat preparation: Electrospinning experiments were conducted using a nanofiber electrospinning unit (Na-Bond Technologies, Hong Kong, China). This unit consists of a cabinet housing electrospinning equipment which included the following: a syringe pump leading to a needle (or the functional equivalent); a controllable high voltage source connecting to the needle; and a rotating collector to collect the fibers. The solution containing CAS was added to the syringe pump prior to the experiments. The collector was wrapped in aluminum foil to facilitate collection of the fibrous mats produced.

Preliminary experiments were conducted by varying the distance from the tip of the needle to the surface of the collector from 12-15 cm, temperature in the range from 30° to 50° C., and flow rate in the range from 0.4 mL/h to 2 mL/h to determine the conditions that would result in formation of the fibrous mats. Electric voltage was set to 23 kV but preliminary results showed that fibers were also formed under other conditions (e.g., at approximately 10 kV at flowrates in the range from 0.4 to 20 mL/hr). The caseinate solutions were cloudy, an indication that all of the protein was not dissolved in solution, and viscous at room temperature but became clear at 50° C. After experiments, the foil wrap holding the dry fibrous mat was removed from the rotating cylinder and placed in a desiccator to protect from moisture until further analysis. The mats were typically 10 cm wide×4 cm long or were oval in shape with the longest diameter of 3 cm. The experiments were performed three times for each set of conditions.

In a single experiment to create a polysaccharide-free caseinate fiber, the fibrous mat created from a 15% PUL and a 20% NaCAS aqueous solution (1:4) (NaCAS content of 84.2%) prepared as described above was soaked with gradient ethanol/glutaraldehyde, starting with 95:5 (v/v) to dehydrate the mat, remove the PUL and cros slink the remaining fiber.

Electron Microscopy: The fibrous mats were coated with a thin film of gold and then examined using scanning electron microscopy (FEI, Hillsboro, Oreg.). The high-vacuum secondary electron imaging modes at an accelerating voltage of 10 kV and working distance of 12.5 mm were used. The distribution of the fiber sizes for 100 fibers of the sample were measured using the XT Docu preloaded software (Soft Imaging System GMBH).

Results and discussion. Electrospinning of PUL: Aqueous solutions of PUL were electrospun at concentrations of 5, 10 and 15% (w/w). Scanning electron microscopy (SEM) of the electrospun PUL fibers are shown in FIG. 1. Electrospinning of the 5% solution did not result in fiber formation. Electrospinning of the 10% PUL solution resulted in fibers containing beads and donut shapes because of electrospraying. Electrospinning of the 15% PUL solutions surprisingly resulted in good fiber formation.

A requirement for good fiber formation is entanglement of the polymer chains in solution. Stijnman et al. (2011) noted that polysaccharides form fibers when the viscosity at 1000 $s^{-1}$ was in the range from about 0.5 to about 6 PA s and the ratio of the concentration of a polysaccharide solution, c/ to the overlap concentration, c*, ranged from about 10 to 25; c* was calculated from the intrinsic viscosity and was defined as that at which fibers begin to form; c/c* was reported as 11.25 with c of 15 (w/w) % for PUL in agreement with this study (Stinjman et al. 2011; Kong, L., and G. R. Zeigler, Food Hydrocolloids, 38: 220-226 (2013)).

The average diameters of the electrospun PUL fibers did not change significantly in size with an increase in concentration. Fiber diameters obtained from the 10% aqueous solutions at 50° C. were 211±63 nm (0.211±0.063 μm) in size. Fiber diameters obtained from the 15% solution were 192±46 nm (0.192±0.046 μm). Kong and Zeigler (2013) reported a most prevalent fiber diameter range of 330-452 nm for electrospinning of PUL from 12% (w/v) aqueous solution at 20° C. The sizes of the fibers depend on the viscosity of the solution, which may be manipulated by temperature. In our study, experiments were conducted at 50° C. but higher temperatures may result in fibers with even smaller diameters due to the decrease in viscosity, facilitating spinning due to decreased intermolecular interactions (Zhang et al. 2009). This is also balanced by increases in the conductivity and the surface tension of the solution with temperature which was not investigated here.

Figure 2:
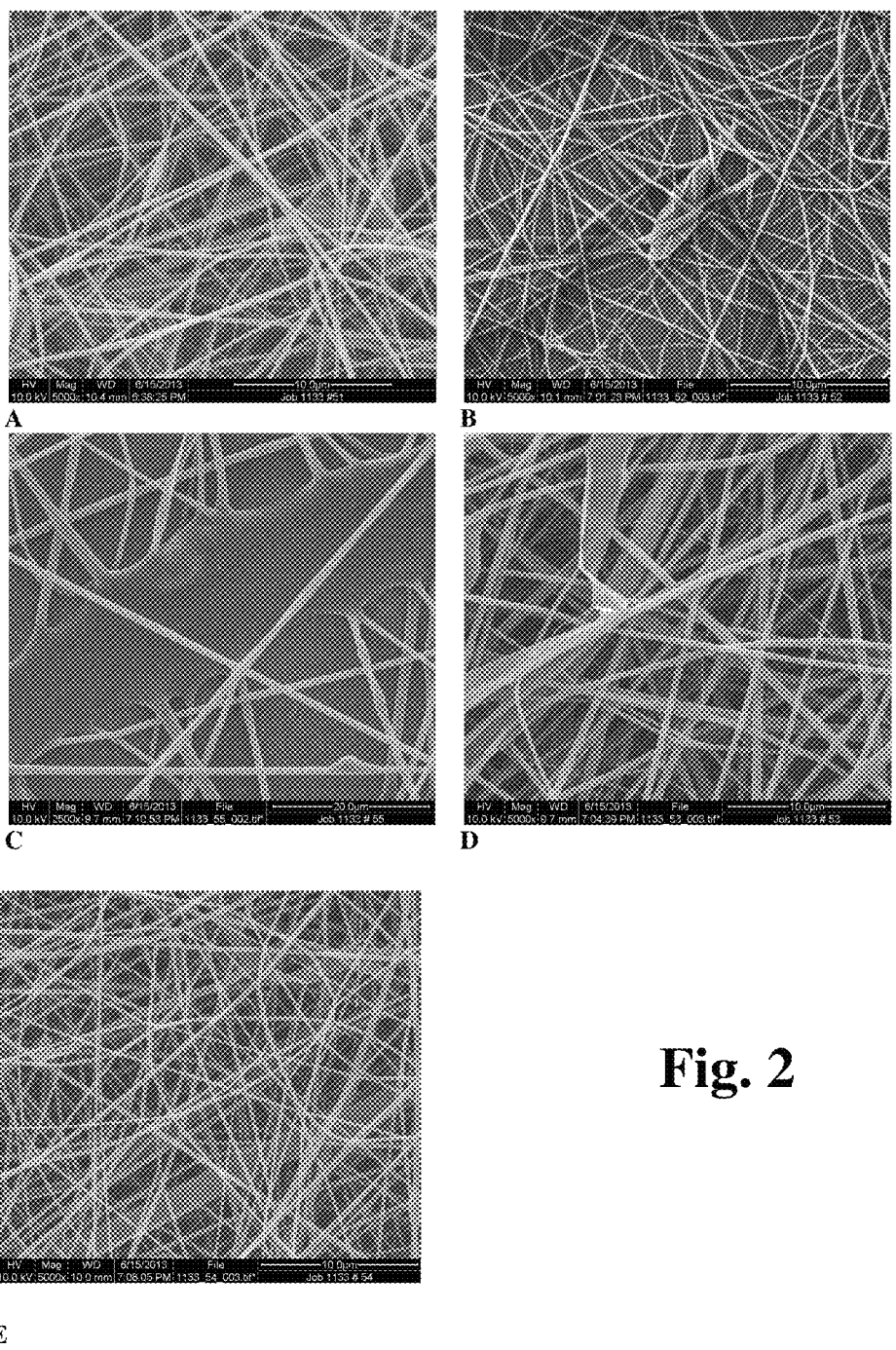
FIG. 2 shows SEM of electrospun fibers obtained from either 15% PUL or 30% PUL solutions and 20% CaCAS solutions in various volume ratios as described below: (A) 15% PUL; 20% CaCAS solutions (1:1)(5000×), (B) 15% PUL; 20% CaCAS solution (1:2) (5000×), (C) 30% PUL; 20% CaCAS (1:1) (2500×), (D) 30% PUL, 20% CaCAS solution (1:2)(5000×), and (E) 30% PUL, 20% CaCAS (1:4)(5000×).

Electrospinning of caseinates with pullulan: It was not possible to electrospin CaCAS or NaCAS in aqueous solution in the absence of a spinnable carrier. Electrospinning of aqueous solutions of 15% PUL with 20% CaCAS in volume ratios of (1:1)(57% CaCAS) and (1:2)(72.7% CaCAS) was then conducted. All values of CAS in parentheses are on a dry basis. SEM of the electrospun fibers are shown in FIGS. 2A and 2B. Both SEM showed relatively good fiber formation although the process may need to be optimized through viscosity adjustment (T or c adjustments) to eliminate imperfections caused by electrospraying. The average diameter of the fibers for FIG. 2A is 263±52 nm (0.263±0.052 μm) and for FIG. 2B is 159±42 nm (0.159±0.042 μm), indicating a decrease in fiber diameter as the amount of CaCAS was increased and the amount of PUL was decreased in the solution.

Electrospinning of 30% PUL solutions with 20% CaCAS solutions in the volume ratios of (1:1)(40CaCAS %) and (1:2)(57%) (FIGS. 2C and D) showed a size distribution of fibers and some electrospraying. FIG. 2E shows relatively good fibers with surprisingly few imperfections for the volume ratio of (1:4)(72.7%). The average fiber diameters for FIGS. 2C, 2D, and 2E were 1020±627 nm, 387±110 nm, and 207±61 nm, respectively, showing a decrease in fiber diameter and the range in fiber diameter as the amount of CaCAS in the solution was increased.

Successful electrospinning of CaCAS required that the concentration of CaCAS exceed that of PUL to obtain fibers with the smallest diameters and with the least variation in size, surprisingly showing that viscosity was the most effective variable for effecting changes in fiber size. The surface tension of CaCAS aqueous solution was increased upon addition of PUL solution, which increased the surface tension necessary to maintain the drop at the tip. Adjustments in surface tension can determine the formation of fibers vs. beads but is also balanced by electric field effects which affect the shape of the initial droplet. In our study, the electric field was adjusted to a constant value of 23 kV but adjustments in this variable would affect the balance with the surface tension.

Figure 3:
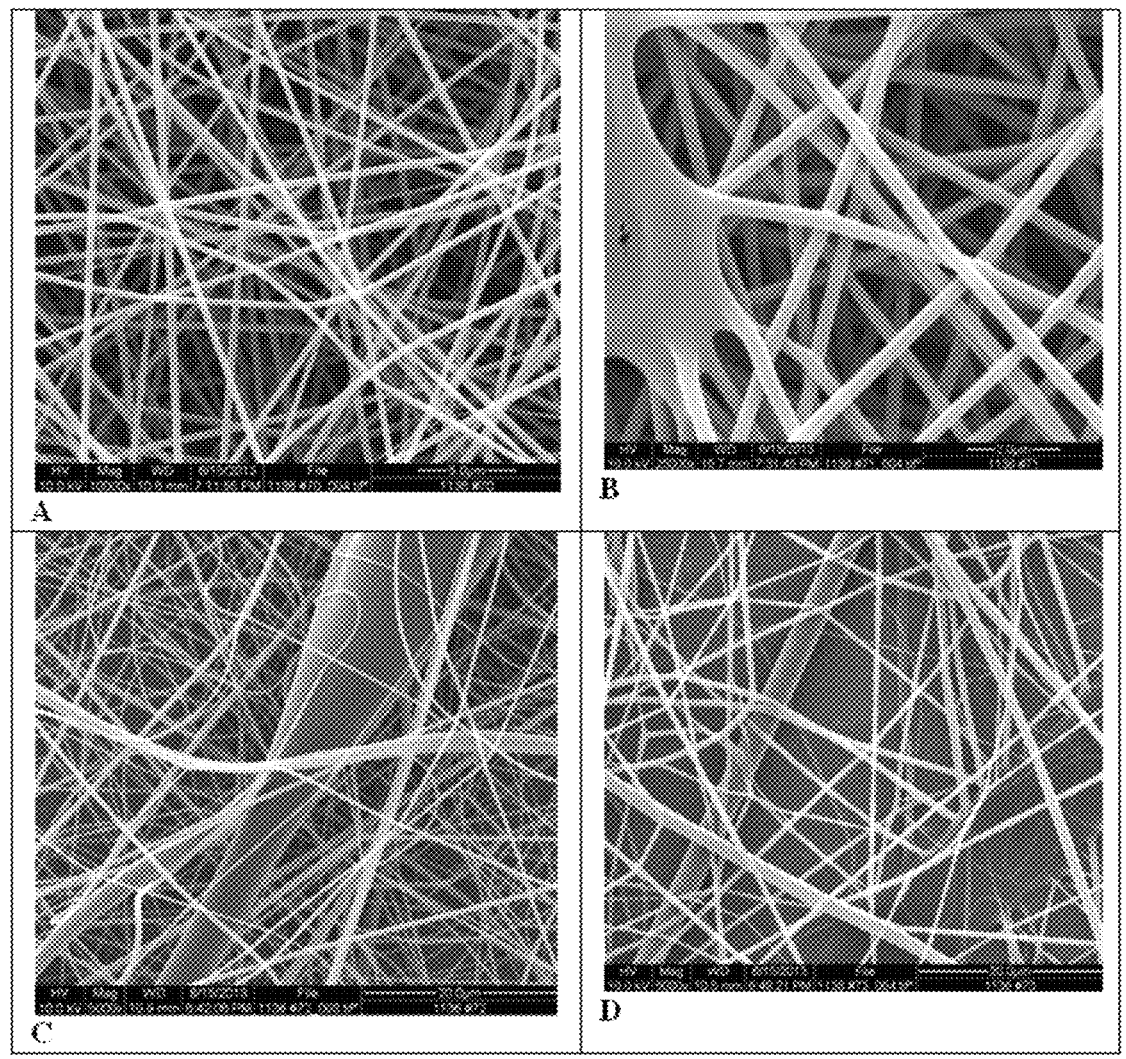
FIG. 3 shows SEM of electrospun fibers obtained from either 15% PUL and 20% NaCAS solutions in various volume ratios #70-73 as described below: (A) (2:1) (10, 000×), (B) (1:1) (25,000×), (C) (1:2)(5000×) (D) (1:4) (5000×).

Aqueous solutions of 15% PUL were also electrospun with aqueous solutions of 20% NaCAS in volume ratios of (2:1) (40% NaCAS), (1:1)(57% NaCAS), (1:2)(73% NaCAS), and (1:4)(84.2% NaCAS). The percentage of NaCAS is also shown in parentheses. The corresponding SEM (FIG. 3A-D) shows the effects of adding progressively larger amounts of NaCAS to the solution mixture. FIG. 3A shows relatively good fiber formation with no apparent imperfections. Increasing the amount of NaCAS resulted in increasing amounts of defects and an apparent wider distribution of fibers of various sizes and electrospraying. The average fiber diameters for FIGS. 3A-3D are 308±56 nm, 319±29 nm, 341±149 nm, and 465±207 nm.

The results for NaCAS indicated that electrospinning of the larger amounts of NaCAS required adjustments in temperature and solution concentrations to adjust viscosity to control fiber size and eliminate electrospraying.

Under constant conditions of electric voltage and distance from the tip of the needle to the collector, the solution with the higher conductivity may result in a more elongated jet and fibers with smaller diameter (Tan, S-H., et al., Polymer, 46: 6128-6134 (2005)). Both Ca and Na have approximately the same ionic radii, 0.99 A and 1.02 A, respectively, but it would be expected that Ca has twice the charge density of Na because of its ionic charge of 2. A comparison of FIGS. 2B and 3C, both with the same 1:1 ratio of PUL:CAS, showed that CaCAS fibers had a smaller diameter than the NaCAS fibers. Surprisingly, the diameter of CaCAS fibers were 159±42 nm and that of the NaCAS fibers were 341±149 nm. It was expected that NaCAS would have the smaller diameter fibers. While Ca has twice the charge density of Na, CaCAS surprisingly had half the electrical conductivity of NaCAS (5396 μS for NaCAS in pure 20% solution vs. 2776 μS for CaCAS); without being bound by theory this is likely due to other various interactions which affected elongation forces on the jet under the electric field, resulting in a fibers with smaller diameter.

Figure 4:
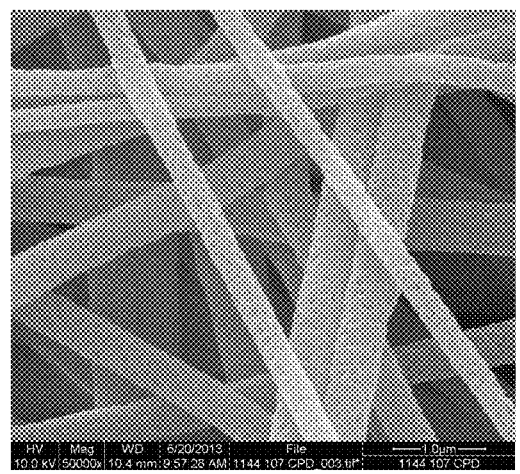
FIG. 4 shows SEM (50,000×) of a dehydrated NaCAS fiber obtained from a fiber that was electrospun from a 15% PUL and 25% NaCAS solution with volume ratio (1:4) and then was immersed in EtOH/Glutaraldehyde (3%) for 4 h, washed with EtOH and then $H_2O$ as described below.

Freestanding casein fibers: FIG. 4 shows the NaCAS fiber reduced in PUL by soaking with ethanol/glutaraldehyde. The fibers or fibrous mats of PUL/NaCAS or CaCAS were soaked in gradient ethanol/$H_2O$ containing 10% glutaraldehyde, the ethanol contents were decreased from 95% to 0% (v/v) in 4 hours, then the fibers and fibrous mats thus treated were washed with DI water to remove free glutaraldehyde. The fiber, as shown earlier in FIG. 3D, had an average diameter of 487±192 nm. After the experiments, removal of moisture and PUL are indicated on the fibers as a series of pores.

Conclusion: Our technology is the first that surprisingly created electrospun fibers from food proteins by using a food-grade polysaccharide to facilitate molecular entanglement in solution and which required no treatments prior to electrospinning. Until now, spinnable polymers were used for protein electrospinning, or materials such as gelatin which are undesirable for food use. New types of foods based on dairy and other food proteins are envisioned which will allow inclusion of micronutrients, heat sensitive bioactives, probiotic/prebiotic blends into functional beverage and food formulations, and possibly foods for medical use; foods to create satiety, tailoring of the bioavailability of foods, and the development of edible sensors. The texture of food will also be affected as well as modification of the water-binding properties of foods to help extend shelf-life. The removal of the carrier will also allow, which is not possible with other technologies, exploration of free standing caseinate fibers, first for non food use and then for food use. This technology may ultimately be found useful in the utilization of surplus dairy and other ingredients to prevent waste.

All of the references cited herein, including U.S. Patents, are incorporated by reference in their entirety. Also incorporated by reference in their entirety are the following references: Frinault, A., et al., J. Food Sci., 62: 744-747 (1997); Konstance, R. P. et al., Textural properties of casein (ate) gels and their utility in creating surimi-like seafood analogues, IN Chemistry of Novel Foods, ed. A. M. Spanier, M. Tamura, H. Okai, O. Mills., Allured Publishing Co., Carol Stream, Ill., Chapter 16, pp 199-215, 1997; Southward, http://nzic.org.n.z/ChemProcesses/dairy/3E.pdf; U.S. Pat. No. 8,066,932; U.S. Patent Application Publication 20060264140; U.S. Patent Application Publication 20080110342.

Thus, in view of the above, there is described (in part) the following:

A method of forming a fiber mat, said method comprising (or consisting essentially of or consisting of) forming an aqueous solution of at least one protein, at least one polysaccharide, and optionally a plasticizer, and electrospinning said aqueous solution onto a collector to form a mat.

The above method, wherein said method utilizes a voltage source connected to a needle, nozzle, tube, or pipe (with epical arrangements).

The above method, wherein the distance between the tip of said collector and said needle, nozzle, tube, or pipe is about 12 cm to about 100 cm (e.g., 12 to 100 cm).

The above method, wherein said voltage source provides about 5 to about 100 kV (e.g., 5 to 100 kV), preferably about 10 to about 30 kV (e.g., 10 to 30 kV), more preferably 10 to about 23 kV (e.g., 10 to 23 kV).

The above method, further comprising (or consisting essentially of or consisting of) soaking said mat in a solution containing at least one member selected from the group consisting of ethanol, methanol, acetone, acetonenitrite, isopropyl alcohol, glutaraldehyde, formaldehyde, and mixtures thereof to remove said at least one polysaccharide.

The above method, further comprising soaking said mat in a solution containing a chemical (e.g., an aldehyde, a mixture of an aldehyde like formaldehyde and sodium cyanoborohydride) that fixes said at least one protein.

The above method, further comprising (or consisting essentially of or consisting of) soaking said mat in a solution containing a chemical (e.g., an epoxide, mixture of an epoxide and sodium hydroxide) that fixes said at least one polysaccharide.

The above method, further comprising (or consisting essentially of or consisting of) soaking said mat in a solution containing a solvent (e.g., water at pH in range of 1-14) that dissolves said at least one protein.

The above method, further comprising (or consisting essentially of or consisting of) soaking said mat in a solution containing a solvent (e.g., water at pH in range of 1-14) that dissolves said at least one polysaccharide.

The above method, further comprising (or consisting essentially of or consisting of) soaking said mat in a solution containing a mixture of solvents (e.g., mixture of water and an organic solvent, or two miscible or immiscible organic solvents) that dissolves said at least one protein.

The above method, further comprising (or consisting essentially of or consisting of) soaking said mat in a solution containing a mixture of solvents (e.g., mixture of water and an organic solvent, or two miscible or immiscible organic solvents) that dissolves said at least one polysaccharide.

A mat formed by the above method.

A mat formed by the above method, wherein said mat is suitable for food-grade applications.

A mat formed by the above method, wherein said mat is not suitable for food-grade applications.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A protein-polysaccharide fiber mat formed by a method comprising:
   forming an aqueous solution of a protein, at least one polysaccharide, and optionally a plasticizer; and
   electrospinning said aqueous solution onto a collector to form a fiber mat,
   wherein the protein is a caseinate protein, and
   wherein the fibers of the fiber mat have a diameter of between 146-1647 nm.

2. The protein-polysaccharide mat of claim 1, wherein said mat is suitable for food-grade applications.

3. The protein-polysaccharide fiber mat of claim 1, wherein the formation method further comprises soaking said mat in a solution containing a chemical that fixes said at least one protein.

4. The protein-polysaccharide fiber mat of claim 1, wherein the formation method further comprises soaking said mat in a solution containing a chemical that fixes said at least one polysaccharide.

* * * * *